Patented July 24, 1928.

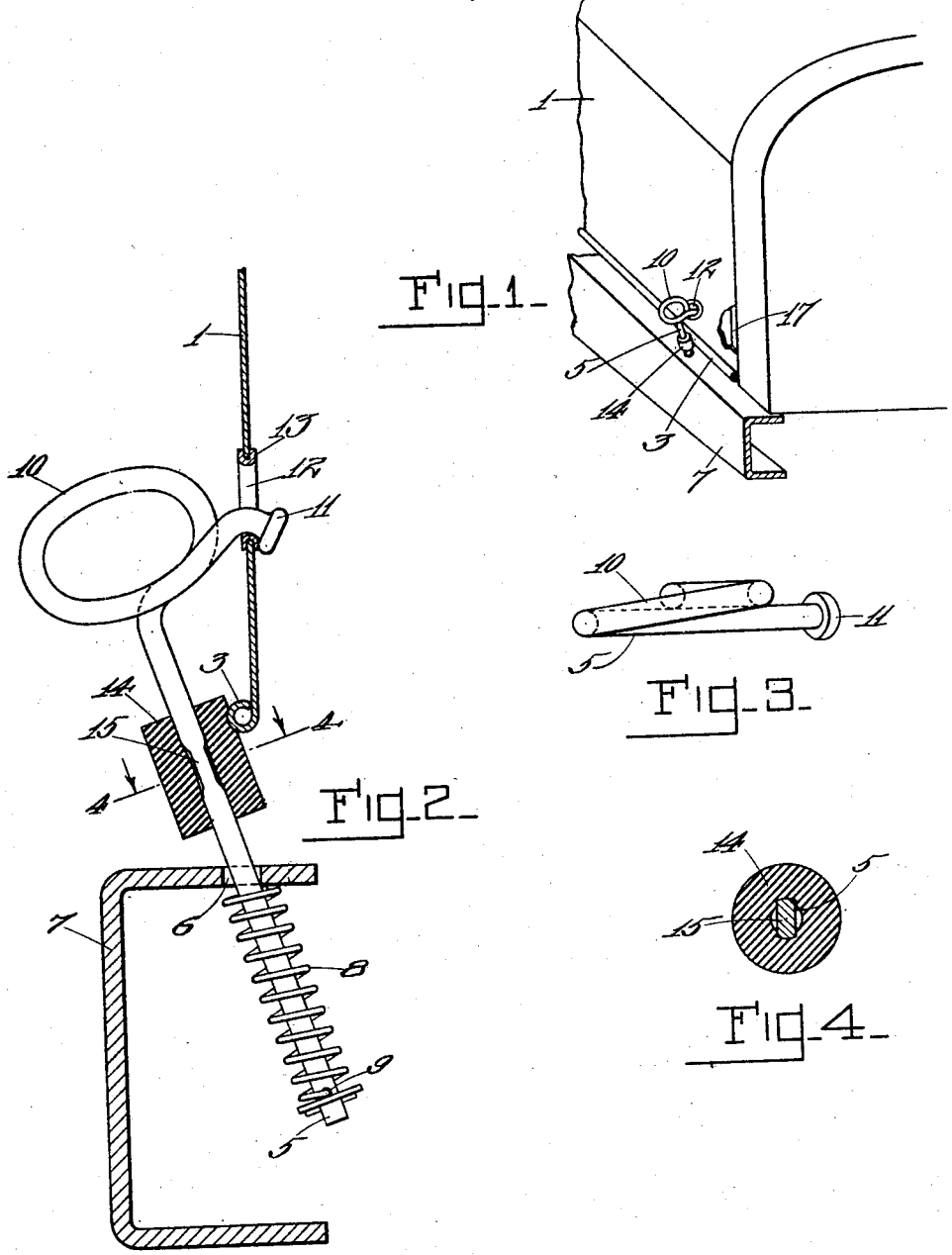

1,678,025

UNITED STATES PATENT OFFICE.

MILLARD H. TONCRAY, OF DETROIT, MICHIGAN, ASSIGNOR TO HUDSON MOTOR CAR COMPANY, OF DETROIT, MICHIGAN, A CORPORATION OF MICHIGAN.

HOOD LATCH FOR AUTOMOBILES.

Application filed July 27, 1923. Serial No. 654,152.

As is well known the bonnet of an automobile has its sides hinged at the top for convenience in opening and closing and it is important that when the bonnet is closed, these hinged sides should be held down so as to maintain them in closed position. It is also important that the holding means or latch should be under tension and exert a resilient pull upon the side member of the bonnet. As usually constructed, this line of pull is exerted in a downward direction only. The result is that in going over uneven places, the side of the bonnet is caused to vibrate somewhat and produces a rattle or creak. One object of the present invention is to provide means whereby there is exerted on the latch not only a downward pull under tension but also a lateral pressure to press the hinged side member of the bonnet firmly against the ledge against which it rests when closed and thus prevent the vibration and creaking.

The invention will be fully understood from the following description when taken in connection with the accompanying drawings, and the novel features thereof will be pointed out and clearly defined in the claims at the close of this specification.

In the drawings:

Fig. 1 is a perspective view of a portion of a car equipped with a bonnet latch embodying the invention.

Fig. 2 is a vertical sectional view.

Fig. 3 is a top plan view of the rod 5.

Fig. 4 is a section on the line 4—4, Fig 2.

Referring now to the drawings:

1 represents one of the sides of a bonnet having at its lower edge a bead 3.

The latch is constructed as follows: A stiff wire rod 5 extends down through an aperture 6 in the side member 7 of the chassis frame. A spring 8 is coiled around the said wire, the lower end of said spring passing through a hole 9 in the lower end of said rod. The upper end of the spring bears against the under face of the top of the side member 7 of the frame. The rod 5 extends upward and outward at an acute angle to the side of the bonnet and is formed with a loop 10 intermediate the aperture 6 in the body 7 and its extreme outer end and is then bent at an angle inwardly, the outer end of the rod being formed with a head 11 which may be formed in any suitable way to form an engaging member at the end of the rod. The headed end of the rod passes through an aperture 12 in the side of the bonnet when the rod is in latching position. Preferably there is inserted in this aperture an eyelet or grommet 13 as a reenforcement and to form an engaging member for the head 11. The spring 8 is under tension and holds the head 11 under tension against the lower side of the inner periphery of the grommet.

A cylindrical bearing member or sleeve 14 is mounted on the said rod 5 in position for its periphery to engage the bead 3 on the lower edge of the bonnet, as shown in Fig. 2. This cylinder is composed of rubber or some other resilient material and fits over the said rod and forms a cushion. To hold said cylinder from sliding axially on said rod, the rod is preferably flattened as shown at 15, see Fig. 4. When the cylinder is assembled with the rod before the latch is installed, the said cylinder is forced on over the flattened part of the rod. The resiliency of the material of which the cylinder is composed permits it to be stretched sufficiently to allow the cylinder to be forced into position and then, the resiliency of the material which engages the flattened portion prevents the sleeve from being moved longitudinally after once it is adjusted.

The loop 10 serves as a handle in manipulating the latch.

When the bonnet is latched, as shown in Fig. 2, the head 11 of the rod enters the hole in the bonnet and hooks over the lower edge of the grommet and there is exerted by the spring 8 not only a downward pressure but also by reason of the inclined position of the rod and cylinder with relation to the side of the bonnet, the cylinder exerts a lateral inward pressure. The stronger the downward pull of the spring 8 the greater will be the pressure with which the bonnet is held against the shoulder or ledge 17 which forms the seat for the side edges of the hinged members.

In order to release the latch, it is simply necessary to pull upon the handle 10 enough to release the head 11 from engagement with the grommet.

While I have shown and described herein the hinged member of the bonnet as being provided with an aperture with which the headed end of the rod 5 engages, any other suitable form of construction by which the upper end of the rod 5 may be engaged with the hinged side of the bonnet may be employed, the essential feature being that the rod and the side of the bonnet shall be so constructed that the rod will exert both downward pull on the bonnet, and an inward pressure toward the supports for the bonnet.

What I claim is:

1. In combination with a bonnet for an automobile having an aperture in its side above the lower edge thereof, of a latch therefor comprising a rod having a hook member at its upper end to engage said aperture, a spring exerting downward and inward pull on the rod and a rubber cushioning member surrounding the rod contacting with the lower edge of the bonnet and taking the inward thrust of the rod.

2. A bonnet latch comprising a rod with a hook to engage the bonnet, a spring exerting a downward and inward pull on the rod and a cylindrical rubber member on the rod contacting intermediate its ends with the edge of the bonnet.

3. The combination with a bonnet for an automobile having an aperture in its side above the lower edge thereof, of a latch therefor comprising a rod having a head or hook portion engaging said aperture, and a spring exerting a downward and inward pull on said rod and bonnet.

4. The combination with a bonnet for an automobile having an aperture in its side above the lower edge thereof, of a latch therefor comprising a rod having a portion inclining upwardly therefrom engaging said aperture, and a spring upon said rod and cooperating with said inclined portion of said rod to cause the latter to exert an inward and downward pressure upon said bonnet.

In testimony whereof I affix my signature.

MILLARD H. TONCRAY.